United States Patent
Houvener et al.

[11] Patent Number: 6,016,480
[45] Date of Patent: Jan. 18, 2000

[54] MERCHANDISE RETURN FRAUD PREVENTION SYSTEM AND METHOD

[75] Inventors: Robert C. Houvener, Nashua; Ian P. Hoenisch, Salem, both of N.H.

[73] Assignee: Image Data, LLC, Nashua, N.H.

[21] Appl. No.: 08/966,182

[22] Filed: Nov. 7, 1997

[51] Int. Cl.[7] .................... G06K 5/00; H04N 7/18
[52] U.S. Cl. .................... 705/21; 705/21; 705/22; 705/27; 705/16; 380/5; 380/23; 235/379; 235/380; 235/382; 382/2
[58] Field of Search .................... 705/21, 22, 27, 705/16; 235/379, 380, 382; 379/112, 91; 382/2

[56] References Cited

U.S. PATENT DOCUMENTS

| | | | |
|---|---|---|---|
| 3,569,619 | 3/1971 | Simjian | 235/380 |
| 3,711,833 | 1/1973 | Starkey | 340/825 |
| 4,156,911 | 5/1979 | Crane et al. | 382/121 |
| 4,858,121 | 8/1989 | Barber et al. | 235/380 |
| 4,991,205 | 2/1991 | Lemelson | 380/5 |
| 4,993,068 | 2/1991 | Piosenka et al. | 380/23 |
| 4,995,081 | 2/1991 | Leighton et al. | 380/23 |
| 5,053,608 | 10/1991 | Senanayake | 235/380 |
| 5,095,196 | 3/1992 | Miyata | 235/382 |
| 5,131,038 | 7/1992 | Puhl et al. | 380/23 |
| 5,224,173 | 6/1993 | Kuhns et al. | 382/2 |
| 5,259,025 | 11/1993 | Monroe et al. | 235/379 |
| 5,321,751 | 6/1994 | Ray et al. | 380/23 |
| 5,337,358 | 8/1994 | Axelrod et al. | 380/23 |
| 5,416,306 | 5/1995 | Imahata | 902/5 |
| 5,436,970 | 7/1995 | Ray et al. | 380/23 |
| 5,466,918 | 11/1995 | Ray et al. | 235/380 |
| 5,500,890 | 3/1996 | Rogge et al. | 379/91 |
| 5,695,038 | 12/1997 | Keith, III et al. | 235/379 |
| 5,832,068 | 11/1998 | Smith | 379/112 |
| 5,895,453 | 4/1999 | Cook | 705/22 |

*Primary Examiner*—James P. Trammell
*Assistant Examiner*—Nga B. Nguyen
*Attorney, Agent, or Firm*—Bourque & Associates, P.A.

[57] ABSTRACT

A system and method for return fraud prevention is provided, which includes a point of return terminal having an input means for accepting, identifying information presented by a person returning at least one article of merchandise and has at least one display unit for displaying digital photographic images of persons and textual information. The system further includes at least one remote database site having stored therein a database comprising a plurality of digital photographic images of persons to be identified. Linking the return terminal and the remote database site is a communications link, which allows data to be interchanged between the point of return terminal and the remote database site. The veracity of the system is ensured by including a means to verifying that the point of return terminal is authorized to access the remote database site, a means for verifying that an identifier present at the return terminal is also authorized to access the remote database site, and a means for verifying that the identifier present at the point of return terminal has compared the digital photographic images displayed on the return terminal display with the physical appearance of the person returning the merchandise and that a match exists between at least one of the displayed photographic images and the physical appearance of the person returning the merchandise.

17 Claims, 4 Drawing Sheets

MERCHANDISE RETURN FRAUD PREVENTION SYSTEM AND METHOD

FIELD OF THE INVENTION

The present invention relates to a field of fraud prevention. Specifically, the invention is directed to a system and method for preventing fraudulent merchandise return transactions by positively identifying persons initiating return transactions and by building and maintaining a remote return history database, which can be accessed from the point of merchandise return as required.

BACKGROUND OF THE INVENTION

The problem of merchandise return fraud, although kept as a close industry secret, is a tremendous problem. Merchandise return transactions can reach as high as fifteen to twenty percent of a retailer's total sales. Thus, for retailers having sales in the range of billions of dollars per year, return transactions can result in hundreds of millions of dollars of items being returned. Unfortunately, not all return transactions are legitimate. Therefore, even small percentages of fraudulent return transactions can result in losses to a company in the range of millions of dollars per year.

Although there are many ways that return fraud can be accomplished, one of the worst methods, from the retailer's point of view, is the case when a purported patron manufactures a merchandise receipt on his or her personal computer at home. As can be appreciated, with the growing sophistication of personal computers and associated programs, such as desktop publishing programs, merchandise receipts can be created, which are virtually identical to a legitimate merchandise receipt issued by a point of sale system at a retail outlet. Once a fraudulent merchandise receipt is created, an individual can then enter a store where the fraudulent return crime is to be committed and remove an article of merchandise that is to be fraudulently "returned" from a store shelf. The individual, armed with a fraudulent receipt and article of merchandise, can then proceed to the store's return counter and present the merchandise and the fraudulent receipt to a clerk to initiate a return transaction.

The current state of the art in the area of return fraud prevention is to ask for some form of personal identification from patrons (such as driver's licenses) who are returning merchandise items at a return counter and attempt to track those individuals who are returning items. The tracking is done by either an individual store by store basis or, perhaps, across a retail store chain.

However, to date, the art has not taught a system or method for preventing merchandise return fraud, which is store or store chain independent and which, in part, uses a positive identity verification system as the backbone of the system. The disclosed invention offers a number of advances over prior art methods of preventing merchandise return fraud, which overcome many of the limitations found in the prior art. The first, and perhaps most significant advantage of the disclosed invention, is that the return fraud prevention system incorporates the features of a positive identity verification system, which is taught in U.S. Pat. No. 5,657,389, issued Aug. 12, 1997 and U.S. patent application Ser. Nos. 08/684,677 and 08/700,815, filed on Jul. 19, 1996 and Aug. 21, 1996, respectfully, as well as Applications for U.S. Letters Patent entitled "Positive Identification Display Device and Scanner for Low Cost Collection and Display of Graphics and Text Data in a Secure Manner", Attorney Docket No. IMAGEDTA-003AX "System and Method for Remote Wireless Positive Identity Verification", Docket No. 002AX, which are both being filed near-contemporaneously herewith. All of the above identified patents and patent applications are commonly owned by the Assignee of the present application and are incorporated herein by reference. The use of a positive identification system is significant in that anytime a person presents merchandise for return, the identity of that person will first be positively verified. Thus, the system would eliminate the possibility of would-be criminals inventing or utilizing multiple identities in order to thwart the ability to accurately track merchandise return transactions by individual. A second, and again significant advantage of the disclosed invention, is that the system is completely independent of the store or store chain where the return transaction is made. Thus, the system is store-independent and allows a remote, return transaction database to be accessible by any subscriber to the system, which would allow for inter-store return transaction history records to be created, maintained and analyzed to detect fraudulent return activity patterns.

SUMMARY OF THE INVENTION

In accordance with the present invention, a system and method for return fraud prevention is provided. The system includes a point of return terminal having an input means for accepting, identifying information presented by a person returning at least one article of merchandise at a return location and has at least one display unit for displaying digital photographic images of persons and textual information. The system further includes at least one remote database site having stored therein a database comprising a plurality of digital photographic images of persons to be identified. Linking the return terminal and the remote database site is a communications link, which allows data to be interchanged between the point of return terminal and the remote database site. The veracity of the system is ensured by including a means to verifying that the point of return terminal is authorized to access the remote database site, a means for verifying that an identifier present at the return terminal is also authorized to access the remote database site, and a means for verifying that the identifier present at the point of return terminal has compared the digital photographic images displayed on the return terminal display with the physical appearance of the person returning the merchandise and that a match exists between at least one of the displayed photographic images and the physical appearance of the person returning the merchandise.

The system further includes a return history database located at the remote database site in which return transactions are stored, return patterns of individuals are tracked and which can be accessed from the point of return terminal to identify a return history record which may indicate that return fraud is occurring.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

The present invention is a system and method to develop, maintain, and use secure and authentic databases located at a remote database site, comprising information that can be used to identify and aid in the prevention of fraudulent merchandise return transactions. The system includes a first database of digital photographic images and other data unique to individuals for positive identification purposes. The system also includes a second database of merchandise return transactions for return fraud identification purposes. The system includes a means for accessing both databases in a secure and cost-effective manner, a means for performing positive identity verification, a means for identifying potentially fraudulent return transactions, and a distributed database update and retrieval system, which allows for low cost operation, ease of use, stability and robustness for vast numbers of return verification requests originating from world wide locations. The invention also includes a means that will allow accountability on the part of users of the system, which in turn will ensure that the system is used to its fullest potential.

Figure 1:
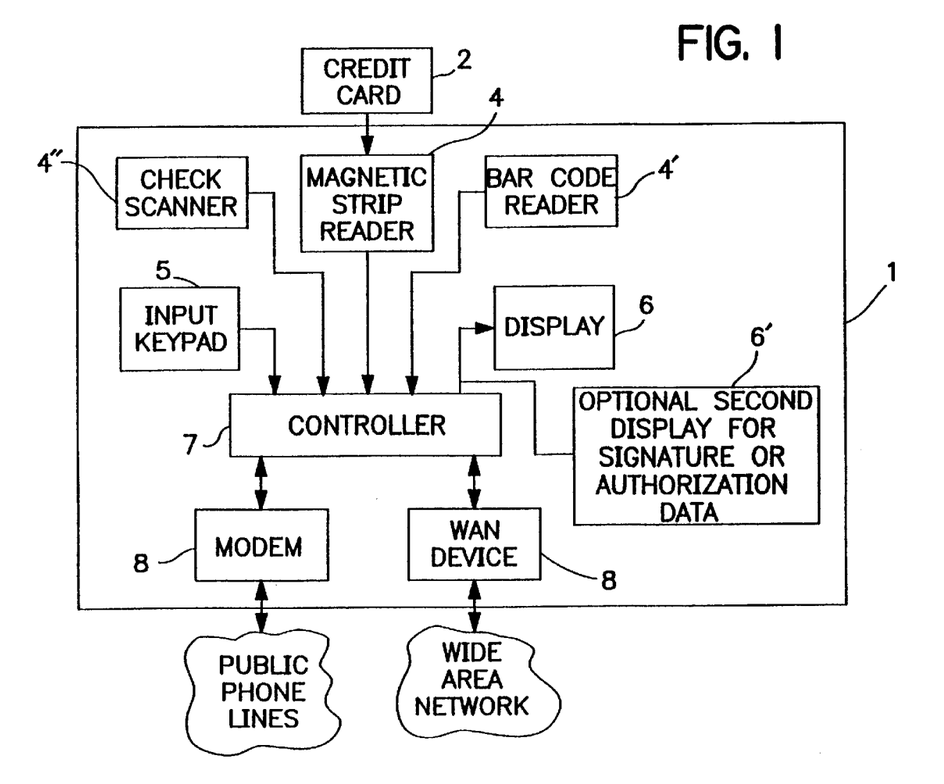
FIG. 1 is a block diagram of the point of return terminal showing various components contained therein.
Figure 2:
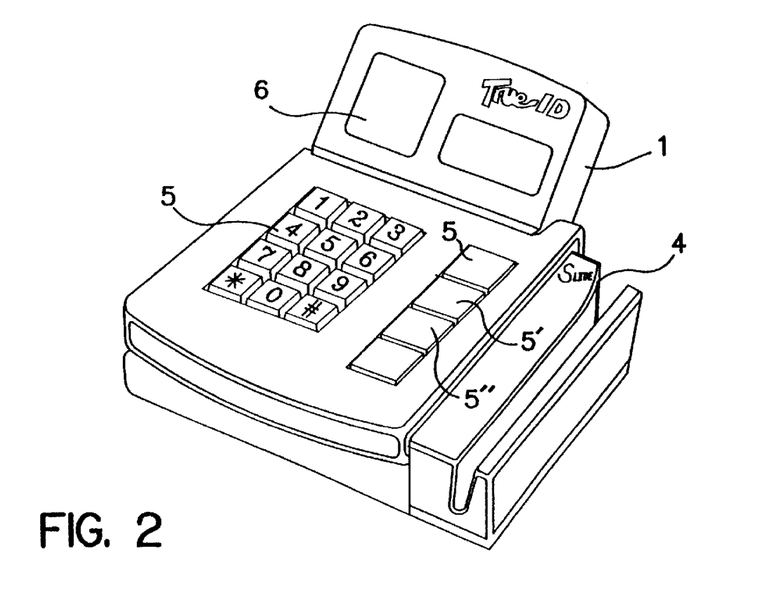
FIG. 2 is a perspective view of one embodiment of the point of return terminal, which would be available for use at a point of merchandise return.
Figure 3:
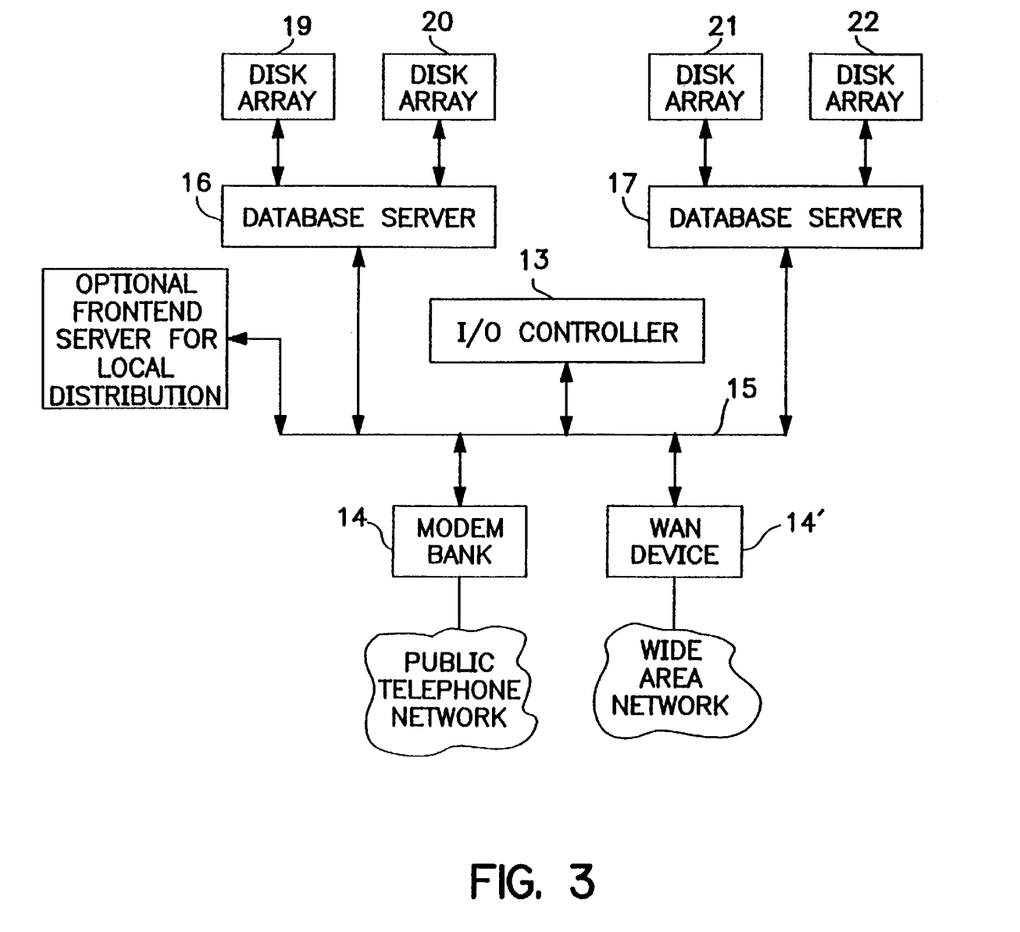
FIG. 3 is a block diagram of one embodiment of a return fraud prevention system and the communication flowpath between the point of merchandise return and the remote database storage and retrieval center, which is where a comprehensive database of digital photographic images of persons and a database of return merchandise transaction records is maintained and can be accessed for transmission to the point of merchandise return.

Referring now to the figures, a return fraud prevention system in accordance with the disclosed invention is shown. A point of return terminal 1 is located at a location where persons return articles of merchandise at a retail establishment. This is typically a single, physical location at a store, such as a customer service counter or the like. However, the disclosed invention could be incorporated into multiple return locations or even into every point-of-sale hardware device at a particular retail establishment. The point of return terminal 1 comprises a number of input devices tailored to accept inputs of data which can be used to positively identify individuals returning articles of merchandise at the point of return. One such input device is a standard magnetic strip reader number 4, which can read a magnetic strip off of a credit card, drivers license or other identification card, which incorporates identification data embedded on a magnetic strip on the reverse side thereof. Optionally, a barcode reader 4' can be included in the point of return terminal, which would read barcode-based identification cards. Magnetic strip reader 4 and barcode reader 4' are both well known in the art. Furthermore, an input keypad 5, a first display means 6, which is preferably a miniature flap panel display, a second display means 6', which is configured to display textual data, which may be, for example, a liquid crystal display (LCD) are included. The terminal also comprises controller 7, and an internal communications modem or other communications means 8 to enable data exchange between the terminal and the remote database site. The exact means of data exchange may vary depending the availability of quality phone lines or other means of data transmission such as a dedicated wide area network, a satellite communications link or other wireless communication links, for example cellular telephone communications or the like.

In a merchandise return situation, the point of return would typically be at a customer service counter which would incorporate a point-of-sale device, such as a cash register. Upon presentation of an article of merchandise to be returned, the store clerk or other individual responsible for processing merchandise returns would request the individual presenting the merchandise for return to produce at least one form of identification, such as a driver's license, passport, credit card or the like. For a form of identification to be acceptable for use by the system, the form of identification must have a unique identifying information unit assigned to it, such as a driver's license number, a social security number, a credit card account number, a checking account number or the like, each of which is mapped to a single individual or small group of individuals, for example spouses in the case of a joint checking account. The account, driver's license, social security, or other number would then be input into the point of return terminal as an identifying information unit.

In the case of driver's licenses and credit cards, both of which routinely include a magnetic strip on the reverse sides thereof, which is encoded with the identifying information unit associated therewith, the preferred method of inputting the identifying information unit would be swiping the driver's license or credit card through the magnetic strip reader 4, which would read the identifying information unit off of the card's magnetic strip.

In the alternative, if the magnetic strip containing the identifying information unit is corrupted, which routinely occurs due to either wear or contact with a powerful magnetic field, the clerk would simple read the drivers license number or account number, for example, off of the presented form of identification where it typically appears in either imprinted or embossed characters, and input the data into the point of return terminal using keypad 5. An alternate means of inputting an identifying information unit into the point of return terminal would be to utilize a coded medium such as a barcode. In this embodiment, a standard barcode reader 4' would be used to read the encoded data off of the presented form of identification and to transfer the data from the barcode to controller 7.

Once the identifying information unit is entered into the point of return terminal 1, the terminal would initiate communications via its internal communications means to one of a number of remote database storage and retrieval sites 9–11 using public telephone lines 12, wide area network 12', or any other available communications means, which would include wireless communications links, such as cellular or satellite communications, or dedicated, hard-wired networks. The actual database storage and retrieval site accessed would be a function of availability and loading on the public access phone lines, network availability, retrieval site availability or other system availability criteria at the time the terminal initiates communications with a remote database site.

Communications will then be established with an input/output controller 13 at the remote database storage and retrieval site through a modem bank 14 at the remote database site. The controller 13 would initiate a query to the point of return terminal 1 to verify that the terminal has the appropriate authority to access the remote database site and is a valid device. One simple and cost effective method of performing this query is to use commonly available caller identification (Caller ID) technology to ensure that the request for data has been originated from an authorized telephone line. Additionally, a software key, such as the one disclosed in U.S. patent application Ser. No. 08/684,677, filed Jul. 19, 1996, may be incorporated into each point of identification terminal. As disclosed in the referenced patent application, the software key will respond in a predetermined manner when queried by a remote database storage and retrieval site.

Once the controller 13 verifies that the requesting point of return terminal 1 is a valid device and has the appropriate access privilege, the terminal will be allowed to transmit an information request to a database storage and retrieval site. The information request is also received by input/output controller 14 over a high speed network 15. The high speed network may be fiber distributed data interface (FDDI), asynchronous transfer mode (ATM) or any other suitable cost effective high speed network. The information request will then be routed to one of a number of a database servers 16–17 where the identifying information unit data is processed. The selected database server will then access a set of high speed, high reliability disk arrays 19–22 and retrieve digital photographic image data and any return history records or other return history data that is associated with the transmitted identifying information unit.

In one embodiment of the system, the remote database site would incorporate a return history analyzer, which would be utilized to analyze or summarize a return history record and to derive return history data, which would be transmitted to the point of return terminal. One type of return history data that could be derived by the return history analyzer is a return history score, which could, for example indicate the number of return transactions that an individual initiated over a specified period of time. A return history score that indicates that an individual has initiated a large number of return transactions within a short period of time may be an indication that return fraud is occurring. Another type of return history data that could be derived by the return history analyzer would be a return fraud probability index, which would be calculated by the return history analyzer and could incorporate other factors in addition to a simple return history score, such as whether a high volume of returns occured shortly after a holiday period. In any event, forwarding summarized of derived return history data to the point of return terminal would eliminate the need for a clerk to him or herself analyze a complete return history record at the time of the return transaction.

The point of return terminal 1 would then receive the digital photographic image and return history data via modem or WAN connection 8 and route the data to controller 7, which would process the information received and display the digital photographic image(s) received on display 6. If more than one digital photographic image is associated with the identifying information unit transmitted to the remote database site, then an indication thereof will also appear on display 6, in which case the clerk could scroll through the transmitted digital photographic images until an image corresponding to the individual presenting the merchandise for return is displayed. The received return history data associated with the transmitted identifying information unit would also be displayed on the display means 6 or, in an alternative embodiment of the invention, on a second, textual display. As can be appreciated, a textual display means that would be large enough to display text data associated with all or part of a return history record would be more cost effective to include at the point of return terminal than a graphical image display unit with similar text display capabilities.

In one embodiment of the invention, both digital photographic image and return history data would be stored at the remote database site in a compressed and/or encrypted state and would be transmitted to the point of return terminal in the compressed and/or encrypted state so as to minimize the time associated with data transfer and enhance the security of the system. In this embodiment, controller 7 would first decompress and/or decrypt the digital photographic image and return history data and then display the same on the display means 6 and/or optional textual display 6'.

In an embodiment which includes encryption and/or compression capabilities the system would include the ability to remotely reconfigure either or both of the compression-decompression and/or encryption-decryption methodologies utilized by the system. The ability to remotely reconfigure these capabilities would greatly reduce the maintenance costs of the deployed devices, increase the life of the devices by allowing new encryption and compression technologies to be loaded and increase the security of the system by allowing changes to encryption strategies as conditions demand.

Reconfiguration could be accomplished at any time a point of identification terminal initiates communications with the remote database site. Upon the initiation of communications, in addition to the other security checks mentioned earlier, the database site will perform a compression/encryption verification routine. This routine will verify that the most recent encryption and/or compression methodologies are being utilized by the point of return terminal. The database site will also maintain a history log of updates and/or changes to both the encryption and compression technologies, which may be accessed and analyzed to identify any potential tampering with the system from any point of return terminal.

Provided a point of return terminal passes its initial security checks, the remote database will then be capable of remotely reconfiguring both the encryption and compression technologies utilized. Changes or updates to encryption and/or compression technologies could be performed on a scheduled or random basis or could be perform whenever the veracity of the system comes into question.

In any event, due to the rapid advances of both encryption and compression technologies, it is very important that the system includes the capability to take advantage of the new technologies without having to send an electronic technician physically to each point of return terminal in order to reconfigure each terminal. The disclosed system, by including the ability to remotely reconfigure the compression and/or encryption technologies, provides a cost effective means for providing the highest level of security.

Once communications are established and at least one photographic image and one form of return history data associated with the identifying information unit transmitted to the remote database site are transmitted to the point of return terminal, the clerk must visually compare the image or images displayed on the display unit with the physical appearance of the person presenting the merchandise for return. If a match exists, which indicates that the person returning the merchandise is who that person purports him or herself to be, then the clerk would review the return history data associated with that individual. If both an identification match exists and a review of the return history data does not indicate the likelihood that a fraudulent return event is occurring, then the clerk would input a specified key-stroke sequence on input keypad 5 to indicate that the clerk has in fact verified the identity of the individual and has reviewed the return history data.

The keystroke sequence would be unique to an individual clerk much like a personal identification number (PIN). The individual PIN would then be transmitted to the remote database storage and retrieval site via the communications link where the PIN would be associated with information specific to the particular return transaction being completed and would be stored as a return transaction record for retrieval at a later date should a dispute arise as to whether or a particular return transaction was fraudulent. Furthermore, the system would update the return history record associated with the person returning the merchandise to add the return transaction information to the history record. Thus, return history records will be dynamically updated as return transactions are completed.

In another embodiment of the invention, a retrofit terminal would be used to add return fraud prevention capabilities to existing point-of-sale systems at locations where merchandise can be returned. The retrofit terminal is designed to work in conjunction with existing point-of-sale devices without the necessity of replacing currently existing hardware systems. The retrofit terminal is added at the existing point-of-sale and comprises a modified controller, at least one display unit, and a communications interface. Preferably, one of the display units is a miniature flat panel display similar to the type used in the point of return terminal 1 described above. The display 6 can be located on available counter space or, if space is at a premium, it can be mounted on a pedestal or the like. The retrofit terminal would be connected to a standard power source and to the existing point-of-sale hardware via its internal serial or parallel communications interface.

In this manner, instead of accepting the identifying information unit directly from either a magnetic strip reader 4 or barcode reader 4', as is the case with the standard point of return terminal 1, the retrofit terminal would accept the identifying information unit from installed point-of-sale hardware via a communications interface. The retrofit terminal would then initiate communications to a remote database storage and retrieval site in the manner described earlier in order to retrieve and display digital photographic data and return history records. However, unlike the stand-alone point of return terminal, identifier accountability would have to be provided using inputs entered by the identifier into the existing point-of-sale hardware or through the input of an access authority information unit, such as a unique memorized electronic key implemented PIN retrofit terminal, which is more thoroughly disclosed in U.S. patent application Ser. No. 08/684,677 filed Jul. 19, 1996, which is commonly owned by the assignee of the present invention and is incorporated herein by reference.

Figure 4:
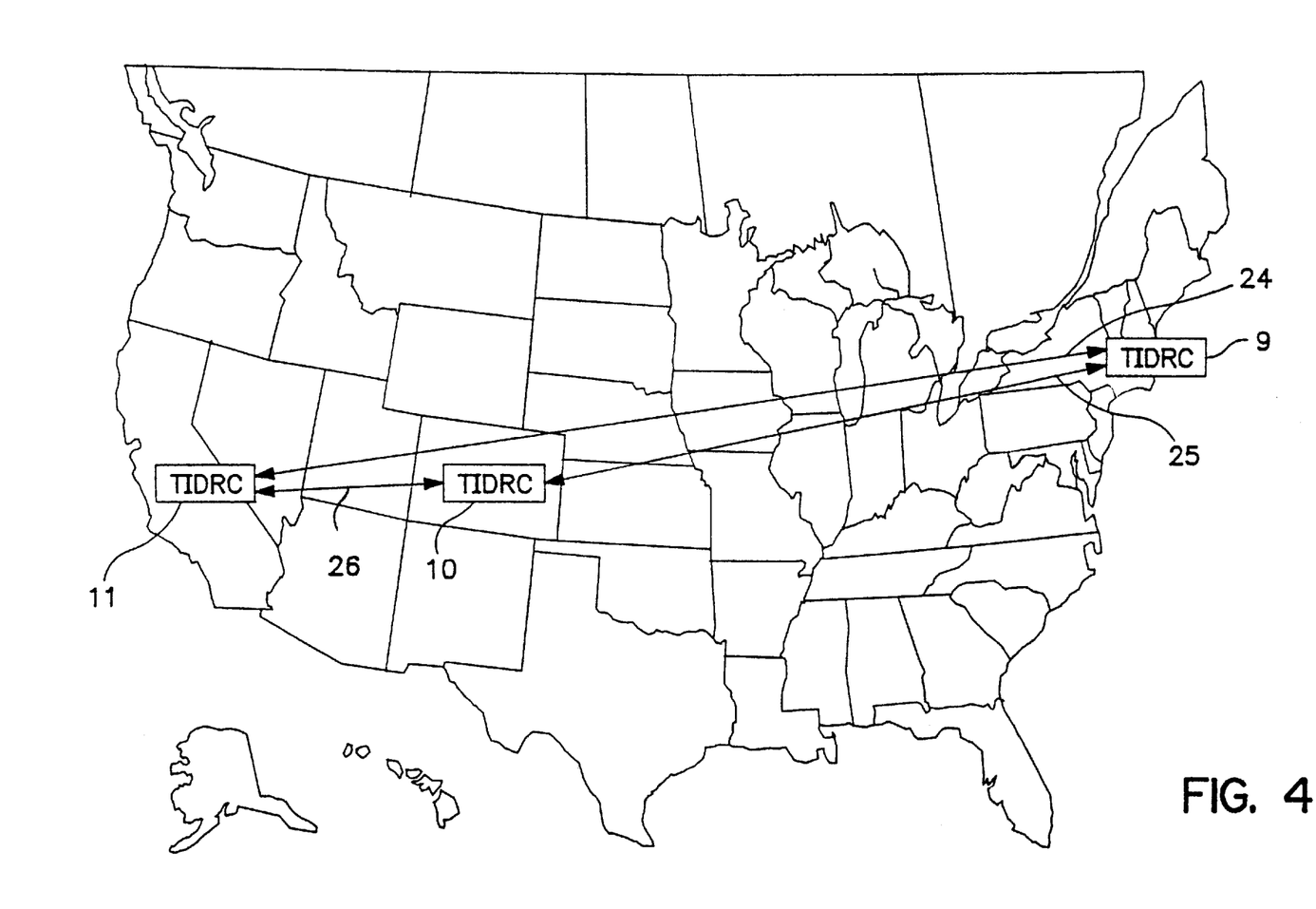
FIG. 4 is an upper level system architecture drawing showing a plurality of database storage and retrieval centers networked over a global high speed network.
Figure 5:
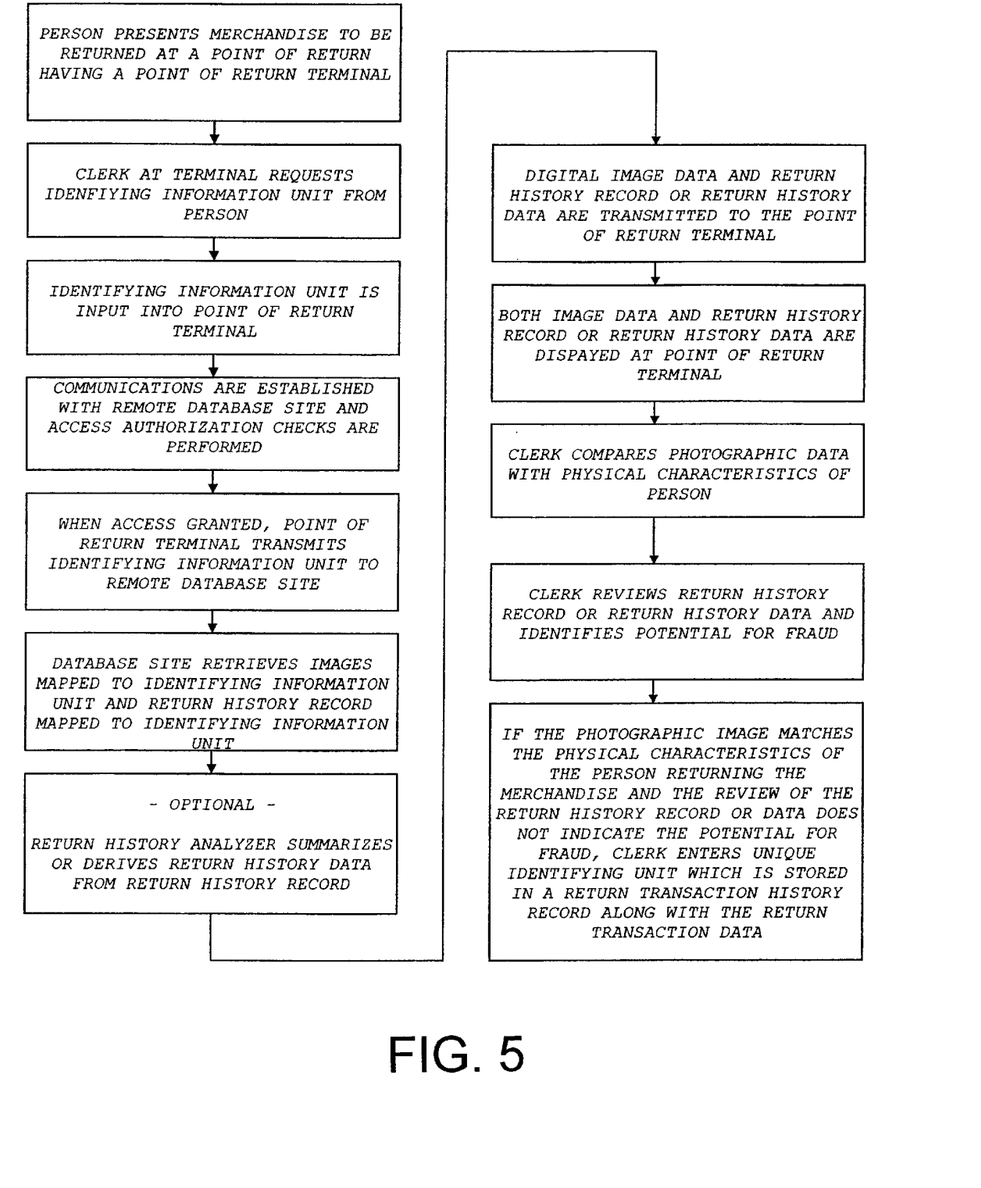
FIG. 5 is a block diagram showing the steps of a method of return fraud prevention utilizing the return fraud prevention system of the disclosed invention.

Multiple remote database storage and retrieval centers would be tied together via a global high speed network 24–26 data from any of the database centers can be routed to any of the centers over the network in order to update the databases, provide redundancy of data, emergency backup, load monitoring and transactional balances.

Thus, the disclosed return fraud prevention system can be incorporated into a retailers' business without the need to replace existing point-of-sale hardware. Furthermore, the disclosed system and method would utilize existing identifying information units such as, drivers licenses, credit cards or the like and, as such, could be implemented without the need to develop and distribute additional cards to be carried by individuals. Thus, implementation of the system and method would be attractive to retailers and would be transparent to consumers.

Various changes coming within the spirit of the invention may suggest themselves to those skilled in the art; hence, the invention is not limited to the specific embodiments shown or described, but the same is intended to be exemplary. It should be understood that numerous other modifications and embodiments can be devised by those skilled in the art that will fall within the scope of the principles of the invention.

What is claimed is:

1. A return fraud prevention system comprising:

a point of return terminal located at a point of return, said terminal having at least one input device for inputting an identifying information unit presented by a person returning at least one article of merchandise at a return location;

at least one display device located at said point of return, said at least one display device for displaying digital photographic images of persons to be identified and textual information;

at least one remote database site having stored therein a database comprising a plurality of digital photographic images for identification purposes, each said stored digital photographic image mapped to at least one identifying information unit;

a communication link linking said point of return terminal and said remote database site to interchange data between the two;

a means for verifying that a clerk present at said point of return terminal has compared any digital photographic images displayed on said point of return terminal display with the physical appearance of the person returning said merchandise and that a match exists between at least one displayed digital photographic image and the physical appearance of said person returning said merchandise; and a return history database for storing return transaction information, including information identifying a person initiating a return transaction and information identifying a clerk responsible for processing said return transaction, as return transaction records.

2. The return fraud prevention system of claim 1, further comprising a return history analyzer for analyzing said return history records and for calculating return history data, said return history data for display at said point of return terminal to assist the clerk at said terminal in identifying when a fraudulent return transaction may be occurring.

3. The return fraud prevention system of claim 1 further comprising a means for verifying that said point of return terminal is authorized to access the remote database site.

4. The return fraud prevention system of claim 1 further comprising a means for verifying that a clerk present at the point of return terminal is authorized to access the remote database site.

5. The return fraud prevention system of claim 2 further comprising a clerk specific input to indicate that said clerk present at said point of return terminal has reviewed said return history data displayed on said point of return terminal display.

6. The return fraud prevention system of claim 5, wherein said clerk specific input to indicate that said clerk has reviewed said return history data and said means for verifying that a clerk present at said point of return terminal has compared any digital photographic images displayed on said point of return terminal display with the physical appearance of the person returning said merchandise and that a match exists comprise a single, clerk specific input.

7. The return fraud prevention system of claim 1, wherein said means for verifying that said clerk present at said point of return terminal has compared said at least one digital photographic image displayed on said point of return terminal display with the physical appearance of the person returning said merchandise and that a match exists comprises a personal identification number, which is input by said clerk using an input means included in said point of return terminal.

8. The return fraud prevention system of claim 7, wherein said personal identification number comprises a keystroke sequence and wherein said input means comprises a keypad.

9. The return fraud prevention system of claim 5, wherein said clerk specific input to indicate that said clerk present at said point of return terminal has reviewed said return history data displayed on said point of return terminal display comprises a personal identification number, which is input by said clerk using an input means included in said point of return terminal.

10. The return fraud prevention system of claim 9, wherein said personal identification number comprises a keystroke sequence and wherein said input means comprises a keypad.

11. The return fraud prevention system of claim 4, wherein said means for verifying that a clerk present at the point of return terminal is authorized to access the remote database site comprises an access authority information unit unique to said clerk, a database comprising a plurality of valid access authority information units located at said remote database site, and a means for comparing, at said remote database site, said clerk's access authority information unit with said access authority information units stored in said valid access authority information unit database to determine if said clerk's access authority information unit matches a valid access authority information unit.

12. The return fraud prevention system of claim 11, wherein said access authority information unit comprises a personal identification number, which is input into said point of return terminal using a keypad.

13. The return fraud prevention system of claim 11, wherein said access authority information unit is embedded in an electronic key token, which is read by said point of return terminal.

14. A return fraud prevention system comprising:
- a point of return terminal located at a point of return, said terminal having at least one input device for inputting an identifying information unit presented by a person returning at least one article of merchandise at a return location;
- at least one display device located at said point of return, said at least one display device for displaying digital photographic images of persons to be identified and return history data;
- at least one remote database site having stored therein a database comprising a plurality of digital photographic images for identification purposes, each said stored digital photographic image mapped to at least one identifying information unit, said remote database site further having stored therein a return history database in which return history records are stored, each said return history record mapped to at least one said identifying information unit;
- a communication link linking said point of return terminal and said remote database site to interchange data between the two;
- a means for verifying that a clerk present at said point of return terminal has compared any digital photographic images displayed on said point of return terminal display with the physical appearance of the person returning said merchandise and that a match exists between at least one displayed digital photographic image and the physical appearance of said person returning said merchandise; and
- a return history analyzer for analyzing return history records and for calculating return history data, said return history data for display on said at least one display device to assist the clerk at said point of return in identifying when a fraudulent return transaction may be occurring.

15. A method of preventing the fraudulent return of merchandise comprising:
- storing a plurality of digital photographic images of persons in an identification database located at least one remote database site, each of said digital photographic images corresponding to at least one identifying information unit associated with a person to be identified;
- accepting an identifying information unit presented by a person returning at least one article of merchandise at a return location and inputting said identifying information unit into a point of return terminal having at least one display device for displaying at least digital photographic image;
- establishing communication between said point of return terminal and at least one remote database site;
- transmitting said identifying information unit presented by said person returning at least one article of merchandise to said remote database site;
- searching said identification database and retrieving any digital photographic images stored therein corresponding to said transmitted identifying information unit;
- transmitting any retrieved digital photographic images to said point of return terminal over said communications link; said at least one photographic image to said return terminal;
- displaying at least one of said retrieved digital photographic images on said at least one display device at said point of return terminal;
- comparing said at least one displayed photographic image with the physical appearance of the person returning the merchandise;
- inputting clerk specific data into said return terminal to indicate that a clerk handling the merchandise return transaction has compared the displayed digital photographic images with the physical appearance of the person returning the merchandise and that a match exists;
- transmitting said clerk specific data and return transaction information to said remote database site; and
- storing said return transaction information in return history records in a return history database located at said least one remote database site, each said return history record mapped to at least one identifying information unit.

16. The method of preventing the fraudulent return of merchandise of claim 15, further comprising the steps of:
- upon receipt of an identifying information unit at said at least one remote database site, searching said return history database and retrieving any return history records mapped to said received identifying information unit;
- analyzing said retrieved return history records and calculating return history data corresponding to said retrieved return history records;

transmitting said return history data to said point of return terminal and displaying said return history data on said at least one display device at said point of return terminal;

reviewing said return history data at said point of return terminal; and entering a clerk specific input indicating that the clerk present at the point of return terminal has reviewed the displayed return history data.

17. The method of prevention the fraudulent return of merchandise of claim 16 further comprising the steps of:

if a return transaction is accepted, transmitting return transaction information regarding the merchandise being returned to said remote database site; and updating said return history database by storing said return transaction information as a return transaction record mapped to said identifying information presented by said person returning said merchandise.

* * * * *